(12) United States Patent
Pisani

(10) Patent No.: US 9,844,121 B2
(45) Date of Patent: Dec. 12, 2017

(54) OUTDOOR LIGHTING APPARATUS FOR FIXED INSTALLATION WITH CONTROL AND COMMUNICATION CIRCUIT

(71) Applicant: ENEL SOLE S.R.L., Rome (IT)

(72) Inventor: Giovanni Maria Pisani, Rome (IT)

(73) Assignee: ENEL SOLE S.R.L., Rome (IT)

( * ) Notice: Subject to any disclaimer, the term of this patent is extended or adjusted under 35 U.S.C. 154(b) by 0 days.

(21) Appl. No.: 15/328,957

(22) PCT Filed: Jul. 30, 2015

(86) PCT No.: PCT/IB2015/055781
§ 371 (c)(1),
(2) Date: Jan. 25, 2017

(87) PCT Pub. No.: WO2016/016846
PCT Pub. Date: Feb. 4, 2016

(65) Prior Publication Data
US 2017/0245350 A1    Aug. 24, 2017

(30) Foreign Application Priority Data
Jul. 31, 2014  (IT) .............................. RM2014A0439

(51) Int. Cl.
 H05B 37/02   (2006.01)
 H02P 13/06   (2006.01)
 F21S 8/08    (2006.01)

(52) U.S. Cl.
CPC ......... *H05B 37/0263* (2013.01); *H02P 13/06* (2013.01); *H05B 37/0272* (2013.01); *F21S 8/086* (2013.01)

(58) Field of Classification Search
None
See application file for complete search history.

(56) References Cited

U.S. PATENT DOCUMENTS

2008/0157939 A1*  7/2008  Sutardja ............. H05B 37/0254
                                                340/12.33
2013/0134802 A1   5/2013  Taylor

FOREIGN PATENT DOCUMENTS

CN    101965081 A    2/2011
EP     1672810 A1    6/2006
(Continued)

OTHER PUBLICATIONS

International Search Report for PCT/IB2015/055781 dated Feb. 26, 2016.
Italian Search Report for IT RM2014A000439 dated Oct. 28, 2014.

*Primary Examiner* — Jany Richardson
(74) *Attorney, Agent, or Firm* — Thomas Horstemeyer, LLP (57) ABSTRACT

It is described an outdoor lighting apparatus (1) for fixed installation adapted to be connected to a power grid for being supplied with a grid supply voltage. The apparatus (1) comprises at least one light source (6), a driving circuit (30) of the at least one light source (6), a control and communication circuit (20) adapted to control the driving circuit (30) and adapted to communicate with a remote control device (60). The lighting apparatus (1) is adapted to be selectively supplied from the power grid with a first supply voltage value and with a second supply voltage value lower than the first voltage value. In that way, it is possible advantageously to supply the lighting apparatus (1) during the daytime with a safety voltage in order to reduce the electrical hazard.

12 Claims, 2 Drawing Sheets

(56) References Cited

FOREIGN PATENT DOCUMENTS

| | | |
|---|---|---|
| EP | 2182778 A1 | 5/2010 |
| GB | 2480421 A | 11/2011 |
| WO | 2014009880 A2 | 1/2014 |

* cited by examiner

OUTDOOR LIGHTING APPARATUS FOR FIXED INSTALLATION WITH CONTROL AND COMMUNICATION CIRCUIT

CROSS-REFERENCE TO RELATED APPLICATION

This application is the 35 U.S.C. §371 national stage application of PCT Application No. PCT/IB2015/055781, filed Jul. 30, 2015, where the PCT claims priority to and the benefit of, IT Patent Application No. RM2014A000439, filed Jul. 31, 2014, both of which are herein incorporated by reference in their entireties.

The present disclosure refers to the technical field of the lighting apparatuses, particularly for urban or street lighting, and more particularly, it concerns an outdoor lighting apparatus for fixed installation with control and communication circuit.

It is known that the external lighting systems, such as for example the street or urban lighting systems both public and private such as for example industries and shopping centers, are active in the evening and night hours only and they are turned off during daytime. Generally, the turning-off of the lighting apparatuses of those systems is remotely controlled from remote supply switchboards that remove supply from the electrical lines departing from those switchboards for supplying the lighting apparatuses.

Recently, it was observed the trend from few operators not to remove supply from supply electrical lines and therefore to supply the lighting apparatuses with the grid power supply (for example, a low voltage alternating voltage of 230 Vac) all around the clock. In order to do that, the lighting apparatuses have been provided with respective local control devices remotely controlled that turn the light sources off during daytime and turn them on during evening or night hours, keeping the lighting apparatuses, the supports and the whole grid supplied 24 h/24 with the 230Vac voltage. Said trend is a consequence of few councils starting to request the integration of the public lighting systems with added value devices, for example devices for signaling, traffic control, environmental monitoring, etc., which are operating during the whole day.

The above-mentioned solution of the prior art does not require specific devices at the supply switchboard level, but involves an issue given by the increased electrical hazard, to be understood as increased probability that a street user or a maintenance technician can come into contact, also during daytime, with system elements being under power for non-predictable or accidental causes.

Keeping the systems supplied 24/24 h with the grid voltage (for example equal to 230 Vac), the increased electrical hazard is represented both by the increased time during which the systems are supplied at the grid voltage and by the daytime being the day period during which there is the greatest people number along the streets that would be able to come into contact with the public lighting systems.

Document WO2014/009880 A2 describes a lighting apparatus according to the pre-characterizing part of claim 1 and having the same above-described issues in reference to the known art status.

Document EP2182778A1 describes a lighting apparatus supplied with a grid supply voltage wherein the control circuit alone is supplied with a logic signal having different logic voltage levels being obtained starting from the grid supply voltage. In any case, also the above-mentioned lighting apparatus has the same above-described issues, because the apparatus is always supplied with a same grid supply voltage, for example with a 230 Vac voltage, from which pulse width modulated logic signals and/or pulse amplitude modulated logic signals supplying the control circuit are obtained. It is clear that this expedient does not reduce the electrical hazard at all as well as it realistically creates some difficulties in the supply of the control circuit because this is supplied directly by a logic signal and not by a grid alternating voltage.

An object of the present disclosure is to provide an outdoor lighting apparatus for fixed installation that allows overcoming the above-described problem in reference to the external lighting systems of the known art.

This and other objects are achieved by means of an outdoor lighting apparatus for fixed installation as defined by claim 1 in its more general form and by the dependent claims in some particular embodiments.

The invention will be better understood from the following detailed description of its embodiments, made by way of non-limiting example with reference to the attached drawings, wherein.

In the attached figures, same or similar elements will be specified by the same numerical references.

Figure 1:
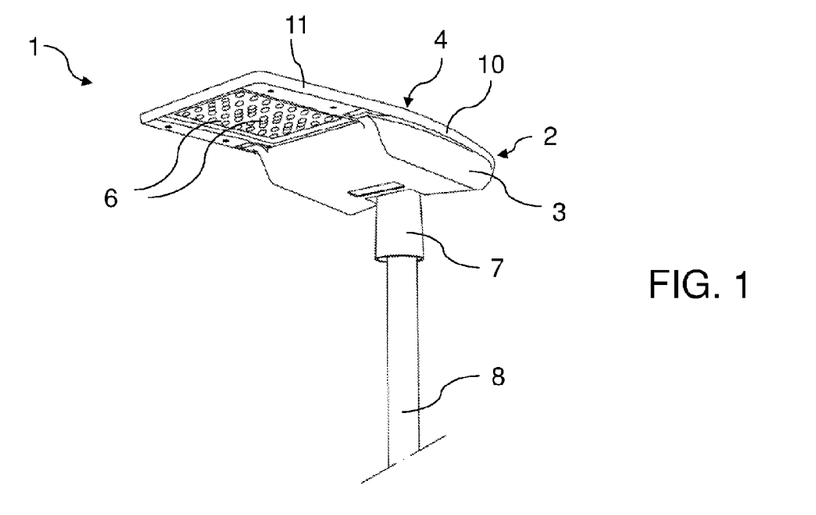
FIG. 1 shows a bottom perspective view of an outdoor lighting apparatus represented in a first configuration and comprising a support pole, that pole being partially represented in FIG. 1.

In FIG. 1, an outdoor lighting apparatus for fixed installation is shown being globally specified with the reference number 1 and that in the following of the present description will be also called lighting apparatus 1.

According to one preferred embodiment, the apparatus 1 is an external lighting apparatus of a public lighting system, for example installed in order to light a street or a site having a particular artistic and monumental value, or an external lighting apparatus belonging to a private system, for example adapted to light the external area of a parking or a shopping center.

The lighting apparatus 1 comprises a chassis 2. The chassis 2 preferably, but without limitations, comprises a base 3, a cover 4 and preferably one or more hinge elements 5 adapted to connect the base 3 and the cover 4 to each other. Preferably, the base 3 generally has a box shape, for example a generally tray shape, for example a generally square tray shape. Preferably, the cover 4 substantially has a plate shape or a half-shell shape. According to one preferred embodiment, the base 3 and the cover 4 are made of metal and more preferably of aluminum alloy or plastic.

According to one embodiment, the lighting apparatus 1 also comprises one or more reversible coupling elements 7, such as for example a coupling element 7 fixed to the chassis 2, being provided to fix in a removable way the lighting apparatus 1 for example to a support pole 8 or to a support wall, in order to allow a fixed installation during the normal operation of the apparatus 1, but to guarantee the possibility to remove it in any case, for example for emergency maintenance or replacement operations.

Figure 2:
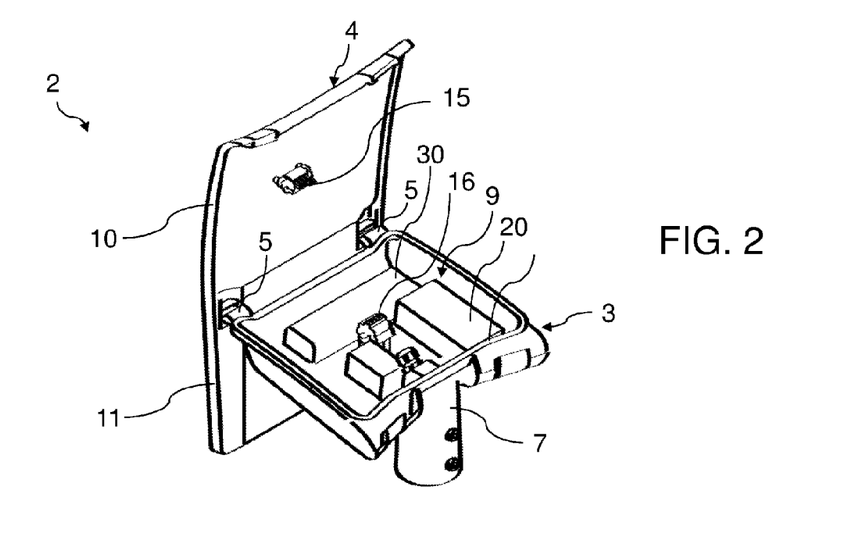
FIG. 2 shows a top perspective view of the lighting apparatus of FIG. 1 represented in a second configuration and without the support pole, wherein that lighting apparatus is represented in a slightly more schematic way than FIG. 1 so that few details represented in FIG. 1 are not represented in FIG. 2 or are represented in a more schematic way.

Referring to FIG. 2, the base 3 of the chassis 2 comprises a housing compartment 9. The cover 4 preferably and without limitations comprises a covering part 10 and an optical part 11. The covering part 10 closes the housing compartment 9 when the cover 4 takes a respective closing configuration. Vice versa, when the cover 4 takes a respective opening configuration, the covering part 10 is arranged in order to display the housing compartment 9 to allow the access to that housing compartment 9. The above-mentioned closing configuration of the cover 4, in which the cover 4 preferably takes a horizontal or substantially horizontal arrangement, is shown in FIG. 1. For this purpose, it should be noted that since the lighting apparatus 1 is generally exposed to weathering, in the closing configuration example of the cover 4 the housing compartment 9 is watertight sealed in order to protect its contents. The above-mentioned opening configuration of the cover 4, in which the cover 4 preferably takes a vertical or substantially vertical arrangement, is shown for example in FIG. 2.

Turning back to FIG. 1, at least one light source 6 and preferably the respective reflection and/or refraction elements are associated with the optical part 11, which preferably is an extension of the covering part 10. According to one preferred and non-limiting embodiment, the cover 4 comprises a plurality of LEDs (Light Emitting Diodes) 6. Generally, the optical part 11 comprises the optics of the lighting apparatus 1. According to one preferred embodiment, that optics comprises a LED module or a LED board comprising a plurality of LEDs 6 and reflection and/or refraction elements such as for example a lens and a protection shield preferably made of a glass sheet. In any case, it should be noted that a lighting apparatus 1 according to the teachings of the present description can generally comprise one or more light sources 6 which can be substantially point light sources, such as for example LEDs 6, but also any other kind of light sources, for example HPS (High pressure sodium) sources or metal-halide sources, adapted to be employed in an outdoor, for example street or urban, lighting apparatus including sources such as the discharge lamps or the metal-halide lamps.

Referring to FIG. 2, the lighting apparatus 1 comprises a control and communication circuit 20 and a driving circuit 30 of the light source 6. According to one embodiment the control and communication circuit 20 and the driving circuit 30 are two physically different circuit modules, for example each made on its own printed board circuit, being interconnected to each other and each of them being provided with its own container. In one alternative embodiment, the control and communication circuit 20 and the driving circuit 30 are two logically different circuit sections of the same circuit module.

The control and communication circuit 20 and the driving circuit 30 are preferably housed inside the chassis 2, however, any of them or both can be external to the chassis 2, for example being housed in one or more containers being fixed to the pole 8, for example inside it, distant from ground or in a dedicated switchboard at the base of the pole 8.

The control and communication circuit 20 is adapted to control the driving circuit 30 and particularly is adapted to selectively enable and disable the driving circuit 30. Preferably, the control and communication circuit 20 is also adapted to control the driving circuit 30, in its enabling status, for regulating the electrical power to be provided to the light source 6 and therefore for regulating the light power being emitted by the light source 6. In other words, the control and communication circuit 20 allows implementing the dimming of the light source 6. Moreover, according to one embodiment, the control and communication circuit 20 preferably allows to detect the operative status of the light source 6, particularly allows to signal a sudden and unexpected turning off thereof, the flickering thereof, in case of discharge lamps, or the exhaustion and end of useful life of the light source 6. Preferably, the control and communication circuit 20 also allows implementing the measurement of the main electrical parameters of the light source 6, particularly of the supply voltage and current values, the power factor (cosfi) and the used energy, day by day.

Figure 3:
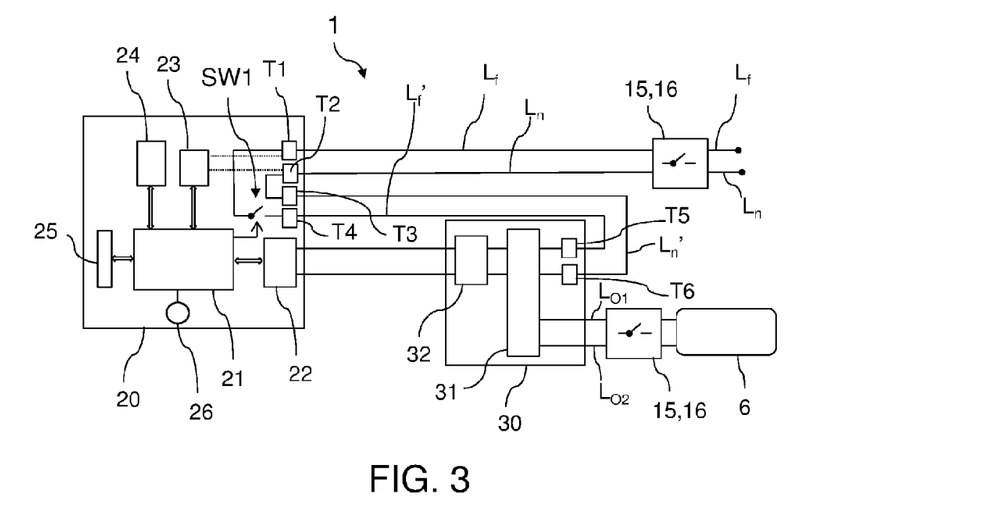
FIG. 3 shows a circuit block diagram of the lighting apparatus of FIG. 1.
Figure 4:
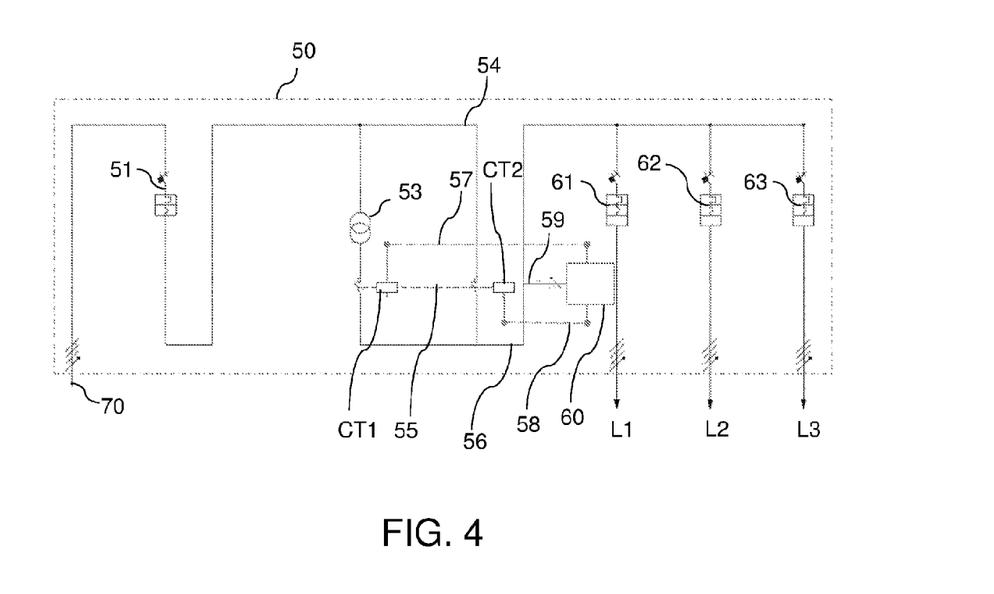
FIG. 4 shows a circuit block diagram of an external supply switchboard of the lighting apparatus of FIG. 1 and being connectable to said apparatus.

With reference to the FIGS. 3 and 4, the lighting apparatus 1 comprises an electrical supply line $L_F$, $L_N$ and the control and communication circuit 20 is such as to receive the electrical supply line $L_F$, $L_N$ at the input in order to be connected to an AC power grid by means of a remote supply switchboard 50. The remote supply switchboard 50 is preferably connected to a plurality of lighting apparatuses 1, for example connected to a series of about ten or hundred lighting apparatuses 1.

In the specific non-limiting example shown in FIG. 3, the electrical supply line comprises two wires $L_F$, $L_N$ and particularly a phase wire $L_F$ and a neutral wire $L_N$.

In the example of FIG. 3, the driving circuit 30 is connected to the light source 6 by means of an electrical line $L_{O1}$, $L_{O2}$, comprising two wires in the example.

Now referring to FIGS. 2 and 3 together, according to one possible embodiment, the lighting apparatus 1 comprises at least one sectioning device 15, 16 adapted to open and close the supply line $L_F$, $L_N$ based on the position of the cover 4 in order to disconnect/connect the control and communication circuit 20 from/to the AC power grid. This advantageously allows to open or close the supply line $L_F$, $L_N$ without the need to use tools guaranteeing the maintenance operations on a turned off apparatus, in total electrical safety conditions.

According to one preferred embodiment, the sectioning device 15, 16 is a multipole device (four poles in the example) and it is adapted to section both the supply line $L_F$, $L_N$ and the interconnection line $L_{O1}$, $L_{O2}$ between the driving circuit 30 and the light source 6.

Referring to FIG. 2, the sectioning device 15, 16 is preferably a sectioning device comprising a male connector 15 provided on the cover 4 and a female connector 16 provided in the base 3.

Preferably, the control and communication circuit 20 comprises one processing unit 21 and at least one memory unit 25.

The control and communication circuit 20 is adapted to control the driving circuit 30 and adapted to communicate preferably in a bidirectional way with a remote control device 60, for example a data concentrator of a powerline communication system. Referring to FIG. 4, in the depicted example, the above-mentioned remote control device 60 is housed inside the supply switchboard 50 preferably connected to a plurality of lighting apparatuses 1 and it allows to remotely control a series of about ten or hundred lighting apparatuses 1. In one alternative embodiment, the remote control device 60 can be arranged externally to the supply switchboard 50. Moreover, it is not necessary that the remote control device 60 is a powerline device because it could be a wireless device for example, being provided with a WI-FI interface for example or it could include both a powerline interface and a wireless interface to communicate with the lighting apparatuses 1.

The above-mentioned remote control device 60 can be possibly connected with a remote control center adapted to control a plurality of remote control devices 60.

The lighting apparatus 1 is adapted to be selectively supplied from the power grid, and in the example depicted by the supply switchboard 50, with a first supply voltage value or a second supply voltage value lower than the first voltage value.

The control and communication circuit 20 is configured to work with both the above-mentioned voltage values. When the first voltage value is provided to the electrical apparatus 1, the control and communication circuit 20 is supplied and it is adapted and configured to keep the supply of the driving circuit 30 enabled while, when the second voltage value is provided to the electrical apparatus 1, the control and communication circuit 20 is supplied and is adapted and configured to keep the supply of the driving circuit 30 disabled.

According to one preferred embodiment, the lighting apparatus 1 comprises an electronically controlled switch SW1 being controllable by the control and communication circuit 20, for example by the control and processing unit 21. That electronically controlled switch SW1 is adapted to selectively take an opening or closing state in order to not-supply/supply the driving circuit 30 and to bring the light source 6 in a turning off state or in a turning on state respectively. In that embodiment:

when the electrical apparatus 1 receives the first voltage value, the control and communication circuit 20 is adapted and configured to keep the electronically controlled switch SW1 in the closing state in order to supply the driving circuit 30; while when the electrical apparatus 1 receives said second voltage value, the control and communication circuit 20 is adapted and configured to keep the electronically controlled switch SW1 in the opening state in order to remove supply from the driving circuit 30.

Preferably, the above-mentioned electronically controlled switch SW1 is a static relay.

According to one embodiment, starting from a condition where the above-mentioned switch SW1 is closed, the driving circuit 30 is supplied and the grid voltage has said first value, the control and communication circuit 20 is configured to receive a turning off signal (for example, a turning off message) from the remote control device 60 and it is such as to command the opening of the switch SW1 as a response to that signal. Preferably, after that opening, the supply switchboard 50 will change the grid voltage so that it takes the above-mentioned second value.

When the grid voltage takes the above-mentioned second value, the control and communication circuit 20, after turning the driving circuit 30 off, will continue to work also during daytime, for example not only to ensure a prompt signaling to the control center in case of module failure (without waiting the turning on of the lighting system during evening hours) but also to allow the continuity of other functionalities that will be described in the following.

Vice versa, starting from a condition where the above-mentioned switch SW1 is open, the driving circuit 30 is not supplied and said grid voltage has said second value, the control and communication circuit 20 is configured to receive a turning on signal (for example, a turning on message) from the remote control device 60 and it is such as to command the closing of the switch SW1 as a response to that signal. Preferably, said closing of the switch SW1 is commanded after the supply switchboard 50 will have changed the supply voltage so that it takes the first value.

According to one particularly advantageous embodiment, the first voltage value is a low voltage value and the second voltage value is a SELV (Safety Extra Low Voltage) very low voltage level. In that way, for example, it is possible to supply the electrical apparatus 1 during daytime with a safety voltage, in that way reducing the electrical hazard. For example, in the case where the supply voltage is an alternating voltage, the first voltage value is greater than or equal to 120 Vac and for example equal to 230 Vac and the second voltage value is lower than or equal to 50 Vac and for example equal to 48 Vac.

Therefore, it is possible to realize how in the embodiment described in the previous paragraph, generally the grid supply voltage provided to the lighting apparatus is an alternating voltage with a non zero peak-to-peak amplitude switchable between a first peak-to-peak amplitude corresponding to said first voltage value and a second peak-to-peak amplitude corresponding to said second voltage value.

In the non limitative embodiment depicted in FIG. 3, the supply line $L_n$, $L_f$ being connectable to the power grid is connected to the control and communication circuit 20 input and the above-mentioned electronic switch SW1 comprises a relay adapted to connect the driving circuit 30 to the supply line $L_n$, $L_f$ in parallel to the control and communication circuit 20 or to disconnect it from said supply line $L_n$, $L_f$.

In the specific example depicted, the wires of the supply line $L_n$, $L_f$ are connected to two terminals T1 and T2 of the control and communication circuit 20 and they supply it, for example being provided for a voltage conditioning circuit (not depicted in the figures) such as for example a voltage regulator and/or a rectifier, a filter, etc. The control and communication circuit 20 comprises a further terminal T4 to which another wire $L_f'$ being connected also to a terminal T5 of the driving circuit 30 is connected. The switch SW1 allows to selectively short the terminals T1 and T4 or disconnecting from each other and in that way allows to connect/disconnect the wire $L_f$ to/from the wire $L_f'$ and therefore providing supply to the terminal T4 or not. Another wire $L_f'$ being connected also to a terminal T6 of the driving circuit 30 is connected to the terminal T3 of the control and communication circuit. Clearly, the above-described detailed embodiment is non-limiting and it is provided by way of example only.

The driving circuit 30 can be also provided with a supply voltage conditioning circuit. The driving circuit 30 for example can be or can comprise a LED array driver or a lamp ballast and can include a power section 31 being connected to the light source 6 and a local data interface section 32 being operatively connected or connectable to a corresponding local data interface section 22 provided for in the control and communication circuit 20. The above-mentioned local data interface sections for example are DALI—Digital Addressable Lighting Interface—bidirectional interfaces or unidirectional interfaces 1-10V and they allow the control and communication circuit 20 and the driving circuit 30 to communicate to each other. For example, through those interfaces the control and communication circuit 20 can modulate the light power being emitted from the source 6 (dimming) and/or can monitor the operative status (proper operation and/or consumption and/or temperature, etc.) of the driving circuit 30 and possibly of the light source 6 too. Preferably, when unidirectional local data interfaces 1-10V are used (in this case the control and communication circuit 20 command the driving circuit 30 but it cannot receive information from the latter) or when the driving circuit 30 does not allow to return information back towards the control and communication circuit 20, the monitoring of the operative status of the lighting apparatus 1 and the measurement of the main electrical parameters will be able to occur in any case through suitable sensors measuring those quantities on the supply interface SW1, T3, T4 of the driving circuit 30.

According to one advantageous embodiment, the control and communication circuit 20 comprises a long-range powerline communication interface 23 in order to communicate with the remote control device 60 on the power grid. For example, the above-mentioned interface 23 is operatively connected to the control and processing unit 21. Additionally or alternatively, the control and communication circuit 20 comprises a long-range wireless communication interface in order to communicate with the remote control device 60. For the purpose of the present description, long-range communication interface means an interface that allows carrying out a communication between two or more entities within a distance of at least equal to 50 meters.

According to one further embodiment, the control and communication circuit 20 comprises a short- or very short-range communication interface 24 adapted to interface a mobile communication and/or configuration terminal of a field operator in order to allow the above-mentioned mobile terminal to access the memory unit in writing and/or reading mode.

For example, the above-mentioned mobile communication and/or configuration terminal is a smartphone or a tablet pc.

For the purpose of the present description, short- or very short-range interface means an interface that allows carrying out a communication within a maximum distance of one meter, preferably less than 30 centimeters and more preferably less than 10 centimeters. For example, the above-mentioned short- or very short-range communication interface 24 is, or comprises, a wireless RF-ID interface or a wireless NFC (Near Field Communication) interface or a wireless Transferjet interface. Preferably, the above-mentioned communication interface 24 is such as to be able to carry out both reading and writing operations from/to the memory 25. According to one embodiment, in case the short- or very short-range communication interface 24 is or comprises a RF-ID tag, the above-mentioned memory unit 25 is comprised in said RF-ID tag.

According to one embodiment, the short- or very short-range communication interface 24 is adapted to allow a field operator to memorize a piece of data or a identifying parameter of the installation position of the lighting apparatus 1 inside the memory unit 25 during the installation phase of the lighting apparatus 1. Preferably, said piece of data or identifying parameter of the installation position of the lighting apparatus 1 comprises the coordinates in a satellite geo-localization system and/or the installation address (for example, street name and possibly street number) and/or a number that allows identifying the relative installation position of the lighting apparatus 1 in a lighting apparatuses array.

According to one embodiment, an identifying piece of data of the apparatus 1 such as for example a serial number and/or a network address and/or an identifying piece of data of the type of lighting apparatus 1 is memorized in the memory unit in a permanent way and preferably in a non-rewritable way, more preferably already during the production phase of the lighting apparatus 1.

According to one embodiment, at least one configuration and/or operative parameter of said apparatus 1 is stored in the memory unit 25 in a permanent way, but preferably in a rewritable way during the normal operation of the lighting apparatus 1.

The use of the above-mentioned short-range or very short-range communication interface, for example of the RFID type, allows to greatly simplify the initial configuration operations of the control and communication circuit 20 being installed in the lighting apparatus 1, in order that the same is recognized by the whole network. On the contrary, in the known art status in order to make the network operational and to identify a lighting apparatus 1 among several other, it is necessary to associate an identifying code of the control and communication circuit 20, for example a MAC address and/or a serial number, with the identifying code being assigned by the maintenance technician with the individual support or with a lighting apparatus 1, for example on the chassis 2. Usually, this association is carried out manually, by reporting the identifying bar code of the MAC address or the serial number of the control and communication circuit 20 on a title block or a paper card, near the identifying code of the support or of the lighting apparatus. These two information then must be reported later inside the remote control software, by manually keying both the codes, possibly with the help of a bar code reader, with a high probability of making association errors. The consequence is that, after inserting data, a certain quantity of lighting apparatuses 1 can be non-operating, for which reason it will be necessary to return on field in order to verify again the association of the two codes. On the contrary, the use of the RFID technology or generally of a short- or very short-range communication interface preferably of a wireless type combined with the use of a smartphone or a palmtop, provided with a suitable application, allows overcoming these configuration difficulties because, during the installation phase of the lighting apparatus 1, it is sufficient to bring the mobile terminal near to the control and communication circuit 20, so that for example the association between the identifying code being memorized in the control and communication circuit 20 and the identifying code of the support or the lighting apparatus 1 (being keyed directly on the smartphone or tablet) take place automatically, without any error chances.

The use of the above-mentioned short- or very short-range communication interface 24 is very useful also in case of maintenance and replacement of defective control and communication circuits 20. With the existing control systems, it is necessary to repeat the code association procedure previously described. With the above-mentioned short-range or very short-range communication interface 24, instead, the replacement of a control and communication circuit 20 is much easier. It is sufficient to replace the defective control and communication circuit 20 with a new and operating one and by means of the smartphone or tablet, which will act to recover all data and identifying codes, through a direct connection to the control software for example on a mobile cellular network, and to download the information in real time and automatically in the new control and communication circuit 20 being installed. The system will act to update all information in real time without any error chances.

According to one possible embodiment, the control and communication circuit 20 also comprises a sensor 26 adapted to measure a quantity related to the tilt of the lighting apparatus. That sensor 26 is operatively connected to the processing unit 21 and allows the control and communication circuit 20 to send a piece of data related to the tilt or to a tilt variation of the lighting apparatus 1 to the remote control device 60. For example, the above-mentioned sensor 26 is an acceleration sensor, for example a MEMS accelerometer preferably a MEMS inertial accelerometer, for example triaxial.

The measurements provided by the sensor 26, that is the measurements of the above-mentioned quantity related to the tilt of the lighting apparatus 1, can be elaborated for example locally by the processing unit 21 but, alternatively or additionally, they can be elaborated by the remote control device 60 too.

Thanks to the provision of the sensor 26, the control and communication circuit 20 can remotely communicate data related to the tilt of the lighting apparatus 1 to allow detecting an accidental fall of the lighting apparatus 1 or a tilt variation for example due to the atmospheric or environmental agents action, such as for example wind or vegetation, varying its tilt with respect to the tilt conditions being set during the installation phase or a variation for example due to a support knocking down caused by a road accident or to a tilting of the same for collapsing of the foundation block.

Moreover, it should be noticed that the information provided by the sensor 26 can be elaborated by the control and communication circuit 20 and/or by the remote control device 60, possibly together with further data coming from other sensors (cameras, acoustic sensors, etc.), in order to give more complex outputs, such as for example the monitoring of areas being subject to landslides (by measuring the tilt variation of multiple lighting apparatuses 1 in a row day by day), the installation of non-authorized objects or apparatuses on public lighting supports such as illuminations, ladders, flower boxes, advertising panels, etc. which can compromise the static properties of the support.

According to one particularly advantageous embodiment, the control and communication circuit 20 is such as to memorize a piece of data related to the tilt being set during the installation phase, for example acquired through the sensor 26, to estimate tilt variations (by means of the sensor 26 and the processing unit 21) and to send to the remote control device 60 warning messages related to tilt variations which, when exceeding a preset threshold, require a maintenance intervention on the lighting apparatus 1 and/or on the support pole 8. Preferably, the above-mentioned warning messages comprise a piece of data or a identifying parameter of the installation position of the lighting apparatus 1, such as for example a parameter or a identifying piece of data of the installation position of the lighting apparatus 1, such as for example the coordinates in a satellite geo-localization system (for example the GPS coordinates) and/or the installation address (for example, street name and possibly street number) or a number that allows identifying the relative installation position of the lighting apparatus 1 in a lighting apparatuses array. As already previously said, the above-mentioned piece of data or parameter can be memorized during the installation phase in the RF-ID tag 24, or generally in a memory being accessible through the short- or very short-range communication interface 24, for example in the memory unit 25.

Referring to FIG. 4, now it will be described one advantageous embodiment of a remote supply switchboard 50 of a lighting apparatus 1. In the following description, reference will be made to the preferred and non-limiting case where the above-mentioned supply switchboard 50 comprises the remote control device 60 and to the case where said remote control device 60 communicates with the lighting apparatus 1 using a powerline communication technology and more preferably through the protocol called "Meters and More" (www.metersandmore.com).

The remote supply switchboard 50 comprises a master switch 51 adapted to connect/disconnect the switchboard to/from an input supply line 70 being connected to a power grid. The above-mentioned power grid is for example a three-phase alternating current distribution power grid, for example, a three-phase power grid at 230 Vac. The above-mentioned main switch 51 preferably is a switch having a thermal-magnetic and/or differential protection system.

The remote supply switchboard 50 also comprises a voltage transformer 53 comprising a primary winding and a secondary winding and adapted to transform an input voltage having the above-mentioned first value in an output voltage having the above-mentioned second value.

In the above-mentioned embodiment, downstream from the main switch 51 the above-mentioned primary winding of the voltage transformer 53 is connected in series with the main switch 51. Moreover, downstream from the main switch 51 an electrical line 54 bypassing the voltage transformer 53 is connected in series with the main switch 51 and in parallel with the voltage transformer 53.

The remote supply switchboard 50 comprises an output supply line 56 and a first CT1 and second CT2 contactors being electronically commanded by the remote control device 60, in the example through the two control lines 57, 58, in order to:

disconnect the secondary winding of the voltage transformer 53 from the output supply line 56 (in the example contactor CT1 open) and connect the output supply line 56 to the bypass line 54 (in the example contactor CT2 closed); or disconnect the output supply line 56 from the bypass line 54 (in the example contactor CT2 open) and connect the secondary winding of the voltage transformer 53 to the output supply line 56 (in the example contactor CT1 closed).

The remote supply switchboard 50 preferably comprises an electromechanical interlocking system 55 adapted to avoid that both contactors CT1 and CT2 are in the closed state at the same time.

According to one possible embodiment, the output supply line 56 is branched in a plurality of parallel supply lines L1-L3 each of them preferably protected by a respective line switch 61-63, for example provided with thermal-magnetic and/or residual current protection.

Each of the above-mentioned parallel supply lines L1-L3, supplies a respective plurality of lighting apparatuses 1. For example, the input supply line $L_f$, $L_n$ of FIG. 3 is connected to the neutral wire and to one of the three phase wires of line L1 or line L2 or line L3.

As it is clearly understood from electrical schematic diagram of FIG. 4, a supply voltage transformer of the above-described kind advantageously allows to supply the output lines L1-L3 with the first voltage value (for example equal to 230 Vac), preferably in the evening or night hours and with the second voltage value (for example 48 Vac), preferably during daytime. The switching between the two voltage values is commanded by the remote control device 60, which is a powerline or wireless data concentrator according to the particular embodiment being represented. The above-mentioned data concentrator 60 can communicate, in the example through the data connection line 59 being connected to the output supply line 56, with the different lighting apparatuses 1 being connected to the output lines L1-L3 for example, but without limitation, in order to communicate an occurring switching of the supply voltage from the first to the second value and vice versa and to command the turning off and on of the light sources 6, the dimming, the receiving of information related to the operative status of the lighting apparatuses 1 being thereof connected, as well as data related to electrical operating parameters of the light source 6 of each individual apparatus, as previously defined.

It is clear that several changes and/or variations can be made to what described and illustrated above by way of example.

Based on what described above, therefore it is possible to understand how the lighting apparatus 1 allows achieving the above-mentioned objectives with reference to the known art status.

The invention principle being understood, it will be possible to vary the embodiments and the details of the embodiments extensively with respect to what has been described and illustrated purely by way of non-limiting example, without departing for this reason from the scope of the invention as defined in the appended claims.

The invention claimed is:

1. An outdoor lighting apparatus for fixed installation adapted to be connected to a power grid for being supplied with a grid supply voltage, the outdoor lighting apparatus comprising:
at least one light source;
a driving circuit of the at least one light source;
a control and communication circuit adapted to control the driving circuit and adapted to communicate with a remote control device;
characterized in that:
the outdoor lighting apparatus is adapted to be selectively supplied by the power grid with a first supply voltage value and a second supply voltage value lower than the first voltage value; and
the control and communication circuit is adapted and configured to operate with both said voltage values in order to communicate with the remote control device and wherein, when the outdoor lighting apparatus is supplied with the first voltage value, the control and communication circuit is supplied and it is adapted and configured to keep the supply of the driving circuit enabled, and, when the outdoor lighting apparatus is supplied with said second voltage value, the control and communication circuit is supplied and it is adapted and configured to keep the supply of the driving circuit disabled.

2. An outdoor lighting apparatus for fixed installation according to claim 1, comprising an electronically controlled switch controllable by the control and communication circuit adapted to selectively take an opening/closure status to not-supply/supply the driving circuit and to bring the at least one light source to a turned-off status or to a turned-on status, respectively, wherein:
when said first voltage value is provided to the outdoor lighting apparatus, the control and communication circuit is adapted and configured to keep the electronically controlled switch in the closure status to supply the driving circuit; and
when said second voltage value is provided to the outdoor lighting apparatus, the control and communication circuit is adapted and configured to keep the electronically controlled switch in the opening status to remove supply form the driving circuit.

3. The outdoor lighting apparatus for fixed installation according to claim 2, wherein, starting from a condition wherein said electronically controlled switch is closed, the driving circuit is supplied and said grid voltage has said first value, the control and communication circuit is configured to receive from the remote control device a turning-off signal and, in response to such signal, is such as to drive the opening of said electronically controlled switch.

4. The outdoor lighting apparatus for fixed installation according to claim 2, comprising a supply line connectable to the power grid and connected in input to the control and communication circuit, and wherein the electronically controlled switch comprises a relay adapted to connect the driving circuit to the supply line in parallel with the control and communication circuit or to disconnect it from said line.

5. The outdoor lighting apparatus for fixed installation according to claim 1, wherein the first voltage value is a low voltage value and wherein the second voltage value is a SELV very low voltage value.

6. The outdoor lighting apparatus for fixed installation according to claim 5, wherein the supply voltage is an alternating voltage, the first voltage value is above or equal to 120 Vac and the second voltage value is less than or equal to 50 Vac.

7. The outdoor lighting apparatus for fixed installation according to claim 1, wherein the control and communication circuit comprises a communication interface using powerline communication to communicate over said power grid with the remote control device.

8. The outdoor lighting apparatus for fixed installation according to claim 1, wherein the control and communication circuit comprises a data interface DALI—Digital Addressable Lighting Interface—to communicate with the driving circuit in a bidirectional manner, or a 1-10 V data interface to communicate with the driving circuit in a unidirectional manner.

9. The outdoor lighting apparatus for fixed installation according to claim 1, wherein said outdoor lighting apparatus is a LED street lighting apparatus or a discharge lighting apparatus, provided with a HPS or metal halide lamp.

10. The outdoor lighting apparatus for fixed installation according to claim 1, wherein said grid supply voltage is an alternating voltage with non-zero peak-to-peak amplitude being switchable between a first peak-to-peak amplitude corresponding to said first voltage value and a second peak-to-peak amplitude corresponding to said second voltage value.

11. A power supply switchboard connectable to a plurality of lighting apparatuses, to supply the plurality of lighting apparatuses, comprising:
a main switch adapted to connect/disconnect the power supply switchboard to/from a supply input line connected to a power grid;
a voltage transformer comprising a primary winding and a secondary winding, and adapted to convert an input voltage having a first value into an output voltage having a second value, wherein, downstream from the main switch, the primary winding is connected in series to the main transformer;
an electric bypass line of the voltage transformer arranged downstream from the main switch and connected in series to the main switch and in parallel to the voltage transformer;
an output supply line and a first and a second contactor electronically driven by a remote control device of the lighting apparatus for fixed installation for:
disconnecting the secondary winding of the voltage transformer from the output supply line and connecting the output supply line to the electric bypass line; and disconnecting the output supply line from the electric bypass line and connecting the secondary winding of the voltage converter to the output supply line;

wherein each of the plurality of lighting apparatuses is an outdoor lighting apparatus for fixed installation adapted to be connected to a power grid for being supplied with a grid supply voltage, comprising:

at least one light source;

a driving circuit of the at least one light source;

a control and communication circuit adapted to control the driving circuit and adapted to communicate with a remote control device;

characterized in that:

the outdoor lighting apparatus is adapted to be selectively supplied by the power grid with a first supply voltage value and a second supply voltage value lower than the first voltage value; and the control and communication circuit is adapted and configured to operate with both said voltage values in order to communicate with the remote control device and wherein, when the outdoor lighting apparatus is supplied with the first voltage value, the control and communication circuit is supplied and it is adapted and configured to keep the supply of the driving circuit enabled, and, when the outdoor lighting apparatus is supplied with said second voltage value, the control and communication circuit is supplied and it is adapted and configured to keep the supply of the driving circuit disabled.

12. An outdoor lighting system comprising:

a plurality of lighting apparatuses, wherein each of the plurality of lighting apparatuses is an outdoor lighting apparatus for fixed installation adapted to be connected to a power grid for being supplied with a grid supply voltage, comprising:

at least one light source;

a driving circuit of the at least one light source;

a control and communication circuit adapted to control the driving circuit and adapted to communicate with a remote control device;

characterized in that:

the lighting apparatus is adapted to be selectively supplied by the power grid with a first supply voltage value and a second supply voltage value lower than the first voltage value; and the control and communication circuit is adapted and configured to operate with both said voltage values in order to communicate with the remote control device and wherein, when the lighting apparatus is supplied with the first voltage value, the control and communication circuit is supplied and it is adapted and configured to keep the supply of the driving circuit enabled, and, when the lighting apparatus is supplied with said second voltage value, the control and communication circuit is supplied and it is adapted and configured to keep the supply of the driving circuit disabled; and a power supply switchboard that is electrically connected to said plurality of lighting apparatuses, wherein the power supply switchboard is connectable to a plurality of lighting apparatuses to supply said lighting apparatuses, comprises:

a main switch adapted to connect/disconnect the power supply switchboard to/from a supply input line connected to a power grid;

a voltage transformer comprising a primary winding and a secondary winding, and adapted to convert an input voltage having said first value into an output voltage having said second value, wherein, downstream from the main switch, the primary winding is connected in series to the main transformer;

an electric bypass line of the voltage transformer arranged downstream from the main switch and connected in series to the main switch and in parallel to the voltage transformer;

an output supply line and a first and a second contactor electronically driven by a remote control device of the outdoor lighting apparatus for fixed installation for:

disconnecting the secondary winding of the voltage transformer from the output supply line and connecting the output supply line to the electric bypass line; and disconnecting the output supply line from the electric bypass line and connecting the secondary winding of the voltage converter to the output supply line.

* * * * *